United States Patent
Kuroda

(10) Patent No.: US 10,717,241 B2
(45) Date of Patent: Jul. 21, 2020

(54) MANUFACTURING METHOD FOR COMPOSITE MATERIAL, MANUFACTURING APPARATUS FOR COMPOSITE MATERIAL, AND PREFORM FOR COMPOSITE MATERIAL

(71) Applicant: NISSAN MOTOR CO., LTD., Yokohama-shi, Kanagawa (JP)

(72) Inventor: Shinichi Kuroda, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/757,761

(22) PCT Filed: Sep. 9, 2015

(86) PCT No.: PCT/JP2015/075647
§ 371 (c)(1),
(2) Date: Mar. 6, 2018

(87) PCT Pub. No.: WO2017/042920
PCT Pub. Date: Mar. 16, 2017

(65) Prior Publication Data
US 2019/0030834 A1 Jan. 31, 2019

(51) Int. Cl.
*B32B 7/00* (2019.01)
*B29C 70/34* (2006.01)
*B29B 11/16* (2006.01)
(Continued)

(52) U.S. Cl.
CPC ........... *B29C 70/345* (2013.01); *B29B 11/16* (2013.01); *B29C 63/04* (2013.01); *B29C 70/48* (2013.01);
(Continued)

(58) Field of Classification Search
CPC ..... B29C 70/443; B29C 70/48; B29C 70/543; B29B 11/16
See application file for complete search history.

(56) References Cited

U.S. PATENT DOCUMENTS

| | | | |
|---|---|---|---|
| 5,418,035 A | 5/1995 | Iguchi et al. | |
| 5,431,870 A * | 7/1995 | Andre | B29B 11/16 264/103 |

(Continued)

FOREIGN PATENT DOCUMENTS

| | | | |
|---|---|---|---|
| GB | 1212390 A * | 11/1970 | ....... B29C 45/14631 |
| JP | 5-185539 A | 7/1993 | |

(Continued)

OTHER PUBLICATIONS

Machine Translation of JP 2006-192745 (A) (Year: 2006).*

*Primary Examiner* — James D Sells
(74) *Attorney, Agent, or Firm* — Foley & Lardner LLP

(57) ABSTRACT

To provide a manufacturing method for a composite material, a manufacturing apparatus for a composite material, a preform, and a composite material, capable of molding a high quality composite material having a little constraint in the shape by improving moldability while suppressing a deviation of the arrangement of the reinforced fiber during preforming. A manufacturing method for a composite material 400 provided with a reinforcement 510 and resin 600 infused into the reinforcement, includes: an apply process (step S12) for applying an adhesive to the sheet-shaped reinforcement having first and second regions 511 and 512 such that a content density of the adhesive 520 of the second region is lower than that of the first region; and a preforming process (step S17) for preforming the reinforcement in a three-dimensional shape to form a preform such that the second region has a curvature larger than that of the first region.

4 Claims, 9 Drawing Sheets

(51) Int. Cl.

| | | |
|---|---|---|
| *B29C 70/48* | (2006.01) | |
| *B29C 63/04* | (2006.01) | |
| *B29C 70/54* | (2006.01) | |
| *B32B 1/00* | (2006.01) | |
| *B32B 7/02* | (2019.01) | |
| *B32B 7/12* | (2006.01) | |
| *B32B 27/08* | (2006.01) | |
| *B32B 27/38* | (2006.01) | |
| *B29K 63/00* | (2006.01) | |
| *B29K 105/08* | (2006.01) | |
| *B29K 307/04* | (2006.01) | |

(52) U.S. Cl.
CPC .............. *B29C 70/545* (2013.01); *B32B 1/00* (2013.01); *B32B 7/02* (2013.01); *B32B 7/12* (2013.01); *B32B 27/08* (2013.01); *B32B 27/38* (2013.01); *B29K 2063/00* (2013.01); *B29K 2105/0881* (2013.01); *B29K 2307/04* (2013.01); *B32B 2260/021* (2013.01); *B32B 2260/046* (2013.01); *B32B 2262/106* (2013.01); *B32B 2307/722* (2013.01)

(56) References Cited

U.S. PATENT DOCUMENTS

| | | |
|---|---|---|
| 5,464,493 A | 11/1995 | Iguchi et al. |
| 5,846,367 A | 12/1998 | Sakaguchi et al. |
| 2007/0023975 A1 | 2/2007 | Buckley |
| 2011/0121487 A1 | 5/2011 | Topping et al. |

FOREIGN PATENT DOCUMENTS

| | | |
|---|---|---|
| JP | 5-237938 A | 9/1993 |
| JP | 9-76266 A | 3/1997 |
| JP | 9-220768 A | 8/1997 |
| JP | 2006-192745 A | 7/2006 |
| JP | 2006-255919 A | 9/2006 |
| JP | 2007-038678 A | 2/2007 |
| JP | 2007-126793 A | 5/2007 |
| JP | 2011-168009 A | 9/2011 |
| JP | 2011-529405 A | 12/2011 |
| WO | WO-2013/118534 A1 | 8/2013 |

* cited by examiner

MANUFACTURING METHOD FOR COMPOSITE MATERIAL, MANUFACTURING APPARATUS FOR COMPOSITE MATERIAL, AND PREFORM FOR COMPOSITE MATERIAL

TECHNICAL FIELD

The present invention relates to a manufacturing method for a composite material, a manufacturing apparatus for a composite material, and a preform for a composite material.

BACKGROUND ART

In recent years, in order to manufacture a lightweight vehicle, a composite material obtained by infusing resin into a reinforcement has been employed as a material for an automobile component. A resin transfer molding (RTM) method has been focused as a manufacturing method for a composite material well-suited for mass production.

In the RTM method, first, a reinforcement is placed in a mold, resin is infused into the reinforcement, and the resin is cured, so that a composite material is molded.

Before placing the reinforcement in the mold, layers of the reinforcements are laminated, and preforming is carried out to mold a preform having a predetermined shape. As a preform molding method, for example, as discussed in Cited Reference 1, a predetermined number of sheet-shaped reinforcements are laminated and are placed in the preform die. Then, they are pressed to mold a predetermined shape. When the laminated reinforcements are conveyed to the preform die, the arrangement of the reinforcements may be deviated disadvantageously. For this reason, a method of suppressing a deviation of the arrangement of the reinforcements by applying the adhesive between layers of the reinforcements in advance is generally employed to fix the reinforcements.

CITATION LIST

Patent Literatures

Patent Literature 1: JP 2011-168009 A

SUMMARY OF INVENTION

Technical Problem

However, if the layers of the reinforcements are fixed with the adhesive, they may become hard to deform when they are pressed and molded in a predetermined shape. In particular, since a shape having a corner portion with a large curvature becomes difficult to mold, a wrinkle or twist may be generated in the preform. For this reason, it is necessary to suppress the shape of the preform to a curvature which does not cause a wrinkle or twist. Therefore, a degree of freedom of the shape is restricted to a low level. As a result, a selection range of the shape of the composite material as a molded product is restricted.

Accordingly, in order to solve the aforementioned problems, an object of the invention is to provide a manufacturing method for a composite material, a manufacturing apparatus for a composite material, a preform for a composite material, and a composite material, capable of molding a composite material with a wide selection range of the shape by improving a degree of freedom in shape of the preform while suppressing a deviation of the arrangement of the reinforced fiber.

Solution to Problem

In order to achieve the aforementioned object, the invention provides a manufacturing method for a composite material provided with a reinforcement and resin infused into the reinforcement. First, an adhesive is applied to the sheet-shaped reinforcement having first and second regions such that a content density of the adhesive of the second region is lower than that of the first region. Then, the reinforcement is preformed in a three-dimensional shape such that the core material is covered by the reinforcement. In order to preform the reinforcement, the second region is placed in a portion having a curvature larger than that of a portion of the core material where the first region of the reinforcement is placed.

In order to achieve the aforementioned object, the invention provides a manufacturing apparatus for a composite material including: an applying unit configured to apply an adhesive to a sheet-shaped reinforcement having first and second regions; a preform die configured to preform the reinforcement in a three-dimensional shape such that the core material is covered by the reinforcement, and the second region is placed in a portion having a curvature larger than that of a portion of the core material where the first region of the reinforcement is placed; and a control unit configured to control operation of the applying unit and the preform die, wherein the control unit controls operation of the applying unit such that a content density of the adhesive of the second region of the reinforcement is lower than that of the first region of the reinforcement, and the control unit controls operation of the preform die such that the reinforcement is molded in the three-dimensional shape in which a curvature of the second region is larger than that of the first region.

In order to achieve the aforementioned object, the invention provides a preform for a composite material formed by infusing an adhesive into a reinforcement. The preform for a composite material has a core material covered by the reinforcement. The reinforcement has a first region and a second region having a content density of the adhesive lower than that of the first region. The second region is placed in a portion having a curvature larger than that of a portion of the core material where the first region is placed.

In order to achieve the aforementioned object, the invention provides a composite material formed using a preform for a composite material formed by infusing an adhesive into the reinforcement. The composite material has a core material covered by the reinforcement. The reinforcement has a first region and a second region having a content density of the adhesive lower than that of the first region, and the first region has a curvature larger than that of the second region. The second region is placed in a portion having a curvature larger than that of the portion of the core material where the first region is placed.

BRIEF DESCRIPTION OF DRAWINGS

FIG. 2 is a diagram illustrating a preforming apparatus for forming a preform according to an embodiment of the invention, in which

FIG. 3 is a diagram illustrating a preforming apparatus for molding a preform according to an embodiment of the invention, in which

FIG. 9 is a diagram illustrating an automobile component manufactured by applying a manufacturing method for a composite material according to an embodiment of the invention, in which

DESCRIPTION OF EMBODIMENTS

Figure 1:
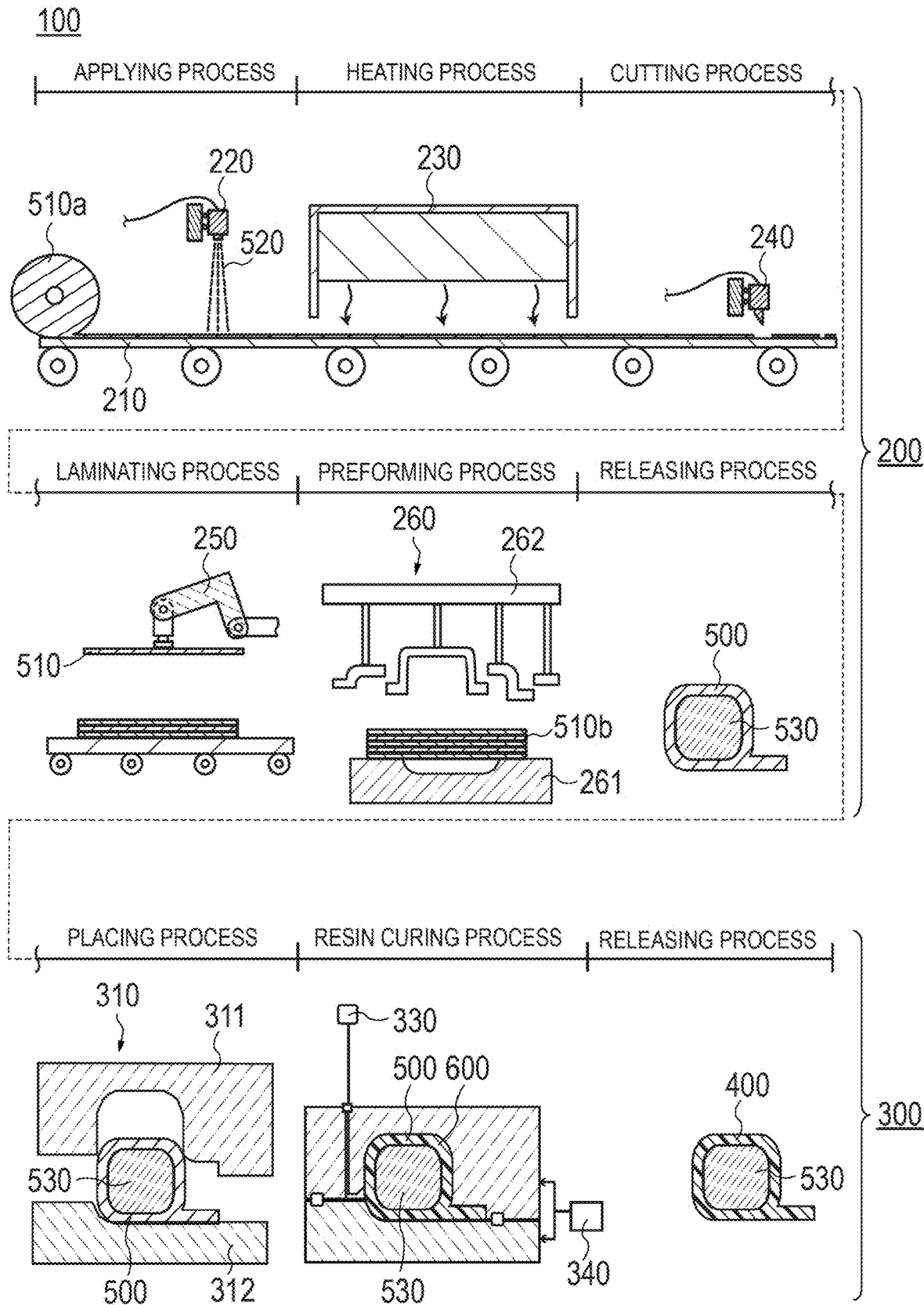
FIG. 1 is a diagram illustrating a manufacturing apparatus for a composite material and a whole flow of a manufacturing method for a composite material according to an embodiment of the invention.

Embodiments of the present invention will now be described with reference to the accompanying drawings. Note that the following description is not intended to limit the technical scope and meanings of terminologies described in claims. In addition, scales or dimensions in the drawings may be exaggerated differently from actual ones depending on situations in some times.

Figure 3A:
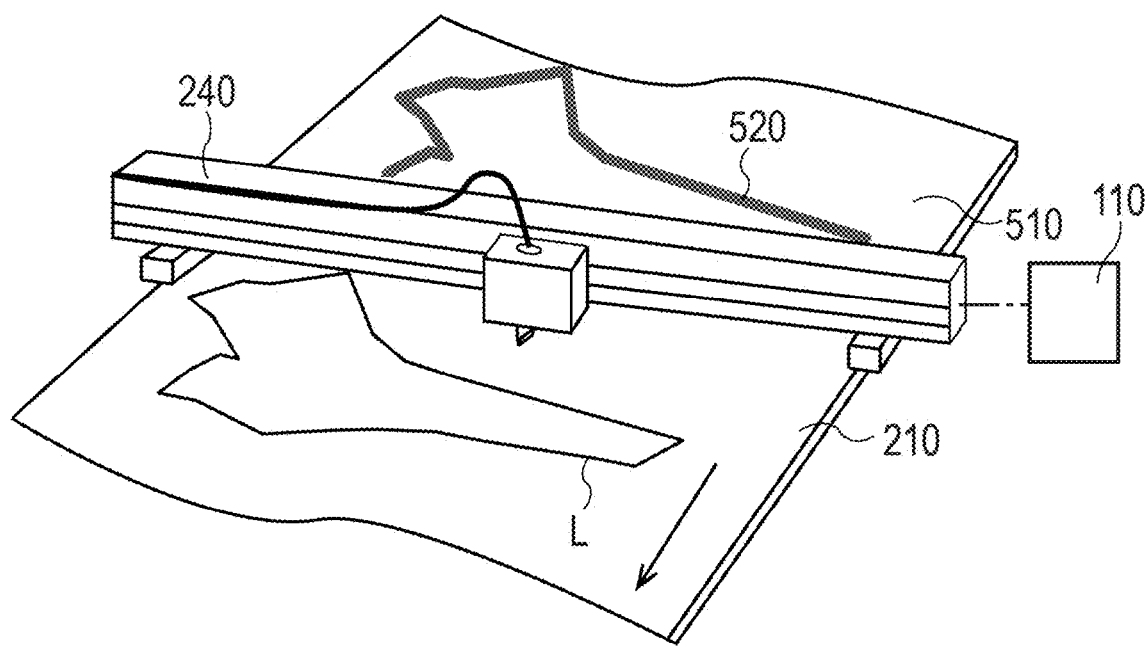
FIG. 3A is a schematic perspective view illustrating a cutting unit.
Figure 3B:
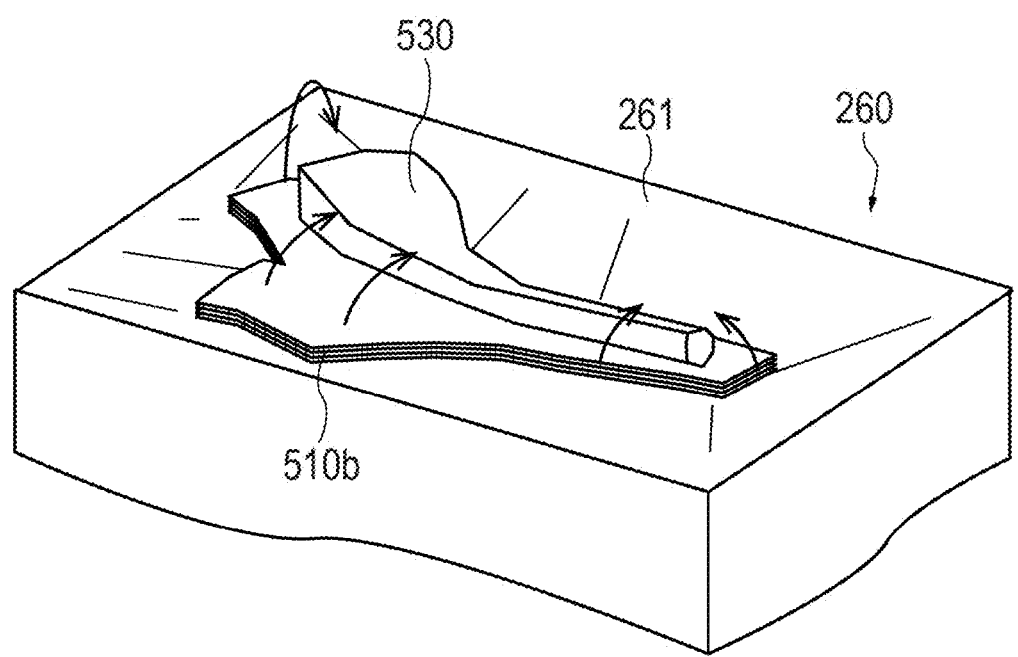
FIG. 3B is a schematic perspective view illustrating a preform die.
Figure 4:
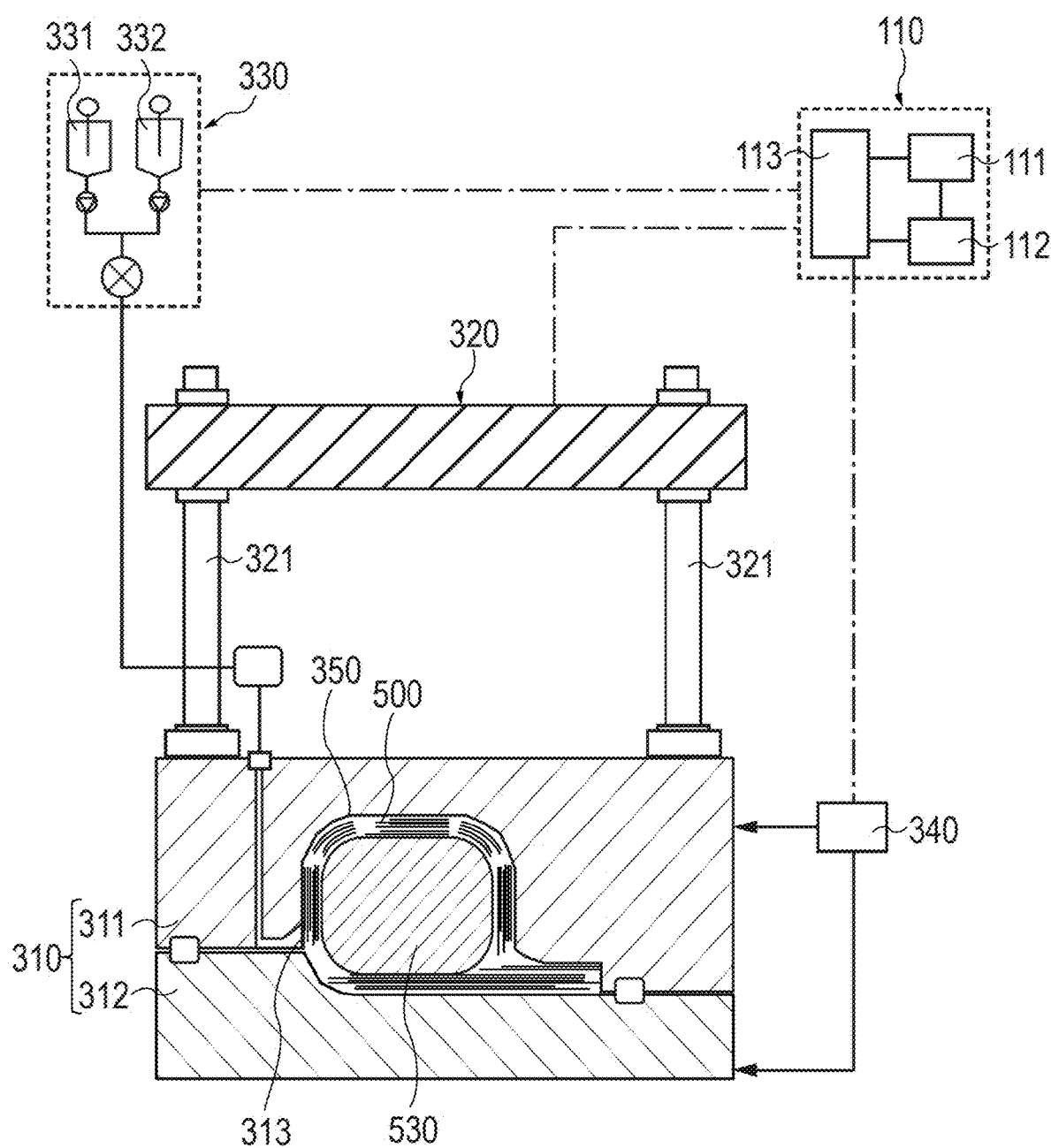
FIG. 4 is a schematic diagram illustrating a molding apparatus for molding a composite material using the preform according to an embodiment of the invention.
Figure 5A:
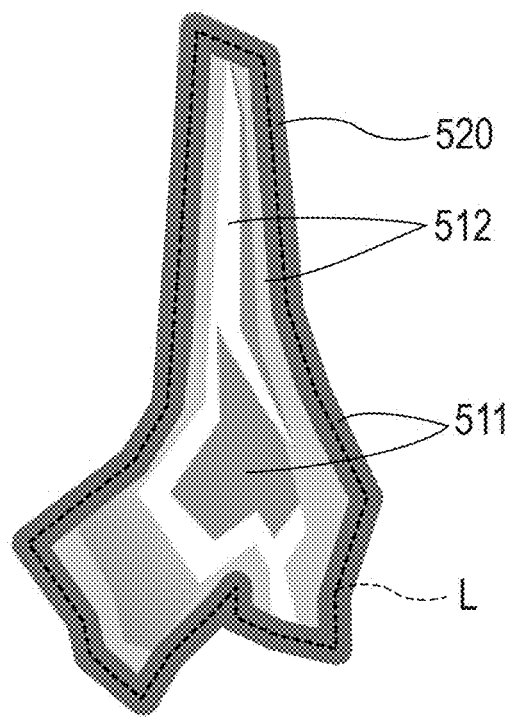
FIG. 5A is a diagram illustrating a content density distribution of the adhesive in the reinforcement.
Figure 6:
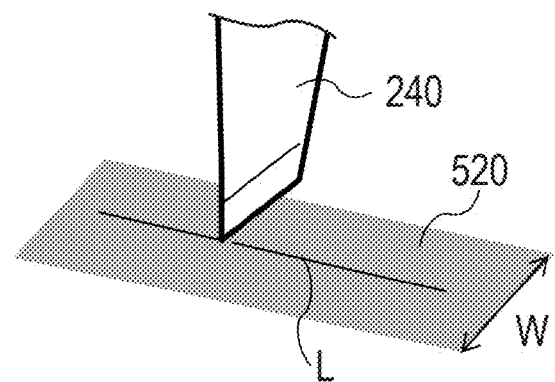
FIG. 6 is a diagram for describing an adhesive application width in the vicinity of the cutting line of the reinforcement cut by the cutting unit.
Figure 7:
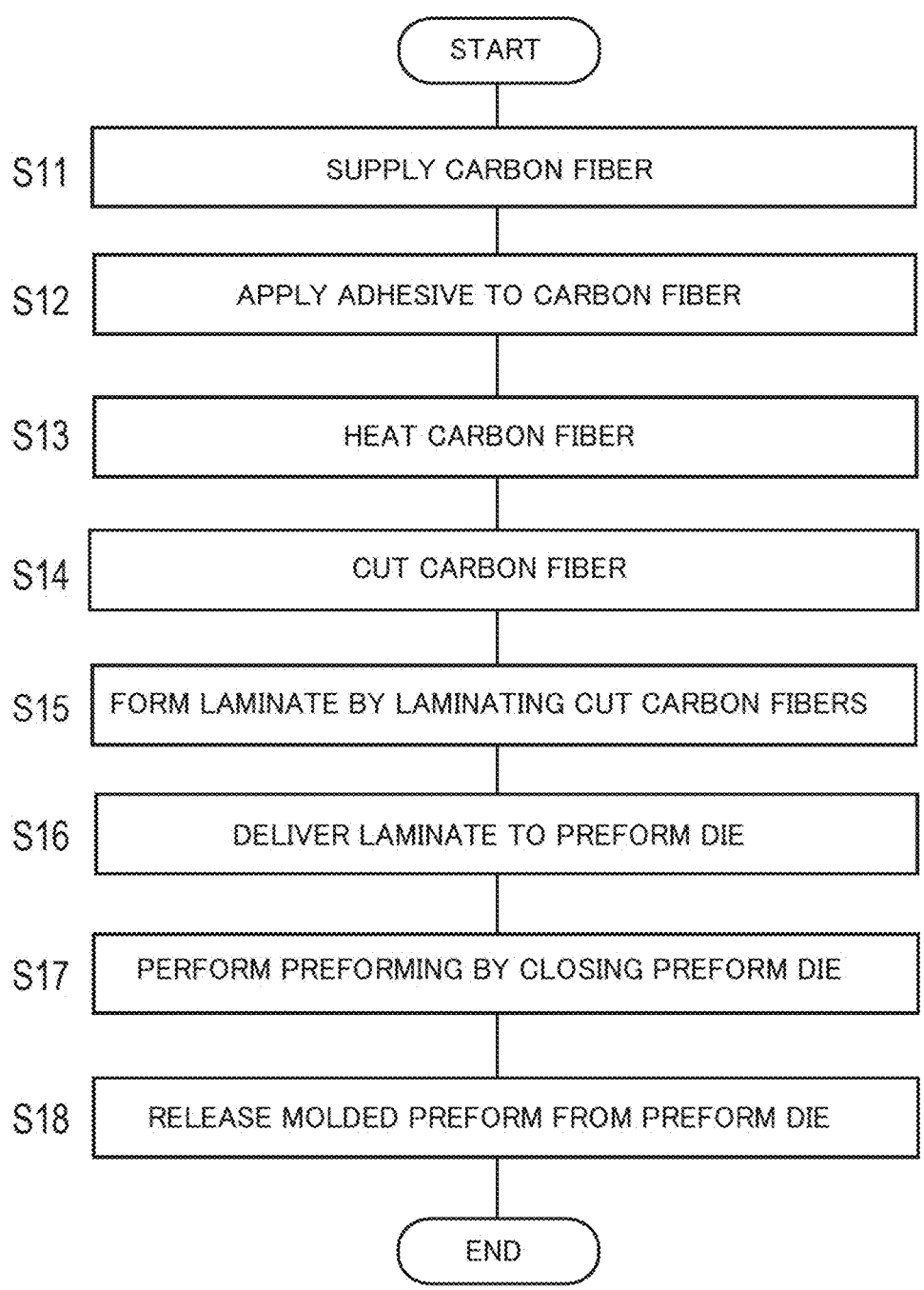
FIG. 7 is a flowchart illustrating a method of preforming the preform according to an embodiment of the invention.
Figure 8:
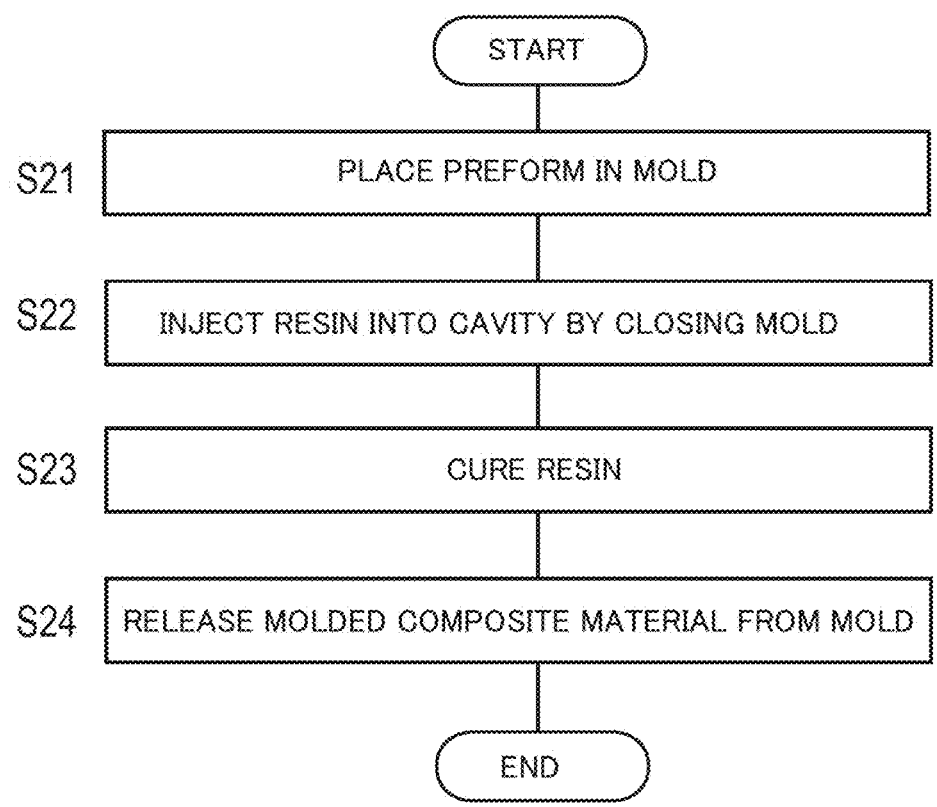
FIG. 8 is a flowchart illustrating a method of molding a composite material according to an embodiment of the invention.
Figure 9A:
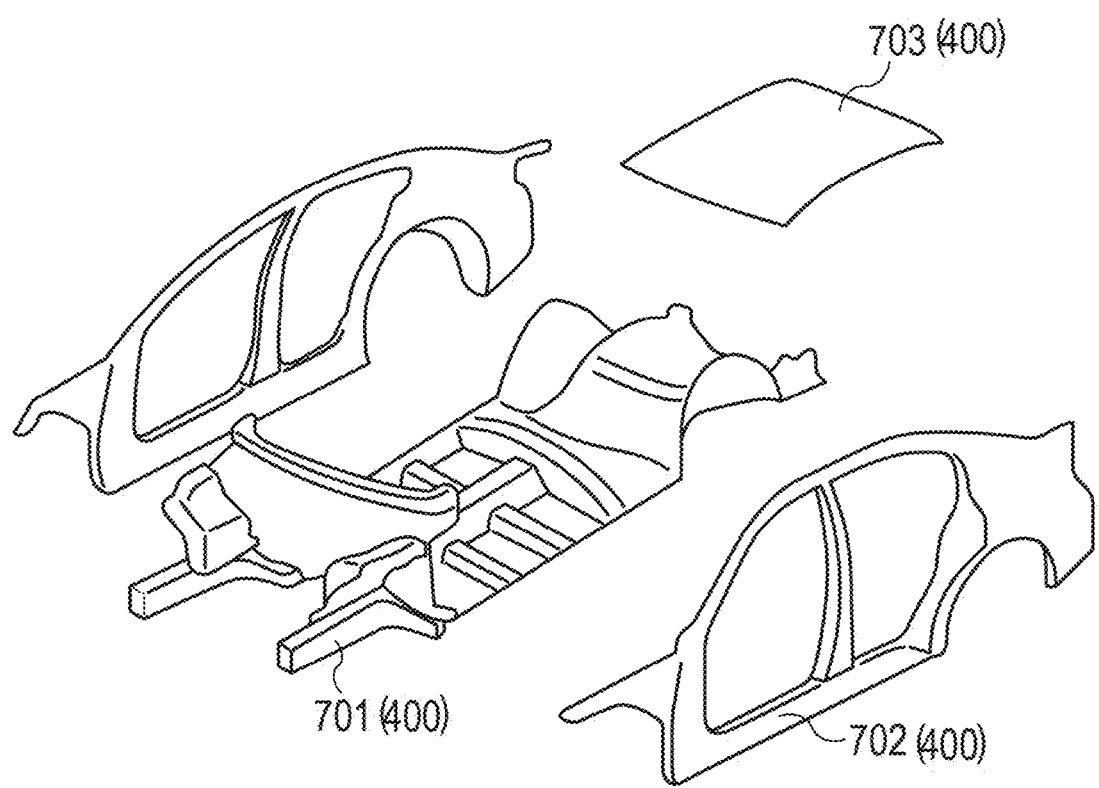
FIG. 9A is a diagram illustrating various automobile components obtained by using a composite material.
Figure 9B:
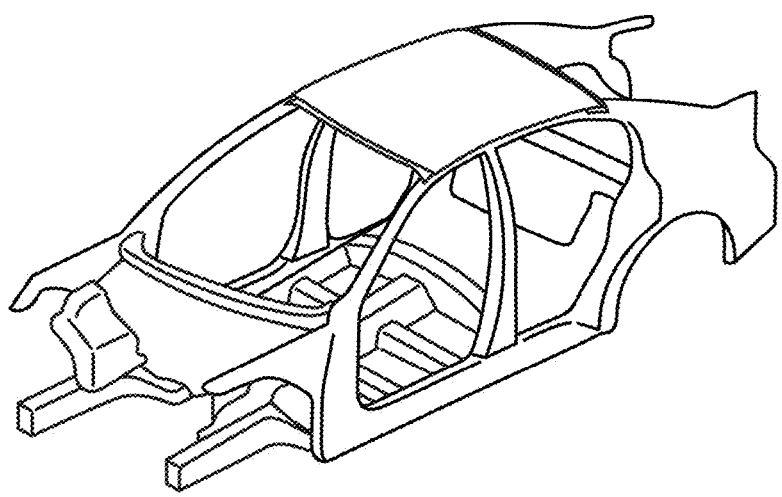
FIG. 9B is a diagram illustrating a car body formed by assembling the automobile components.

FIG. 1 is a diagram for describing a manufacturing apparatus 100 for a composite material 400 and a whole flow of a manufacturing method according to an embodiment of the invention. FIGS. 2 and 3 are diagrams for describing a preforming apparatus 200 for preforming a preform 500 according to an embodiment of the invention. FIG. 4 is a schematic diagram illustrating a molding apparatus 300 for molding a composite material 400 using the preform 500 according to an embodiment of the invention. FIG. 5A is a diagram illustrating a content density distribution of the adhesive 520 in the reinforcement 510. FIG. 6 is a diagram for describing an application width W of the adhesive 520 in the vicinity of the cutting line L of the reinforcement 510 cut by the cutting unit 240. FIG. 7 is a flowchart illustrating a method of preforming the preform 500 according to an embodiment of the invention. FIG. 8 is a flowchart illustrating a method of molding a composite material 400 according to an embodiment of the invention. FIGS. 9A and 9B is a perspective view illustrating automobile components 701 to 703 and a car body 700 obtained by using the composite material 400 according to an embodiment of the invention. Note that the arrows in FIGS. 2 and 3A indicate a conveying direction (directed to a downstream process) of the reinforcement 510 using a conveying unit 210. In addition, the arrows in FIG. 3B indicate a preforming direction when the reinforcement 510 is preformed.

Embodiments of the present invention will now be described with reference to each drawing.

(Preform)

The preform 500 according to this embodiment is formed by infusing an adhesive 520 into the reinforcement 510.

The reinforcement 510 may be formed of, for example, carbon fiber, glass fiber, organic fiber, or the like. According to this embodiment, an example of using carbon fiber as the reinforcement 510 will be described. The carbon fiber 510 has a small thermal expansion coefficient and excellent dimensional stability, so that its mechanical property is not easily degraded even under a high temperature. Therefore, the carbon fiber 510 can be preferably employed as the reinforcement 510 of the composite material 400 for the automobile car body 700 or the like. The carbon fiber 510 may be used to form a sheet-shaped reinforcement 510 such as a unidirectional (UD) material obtained by unidirectionally weaving fibers or a non-crimped fabric (NCF) integrated using subsidiary fibers by multidirectionally laminating a plurality of sheets obtained by unidirectionally weaving fibers. In general, the laminated structure is, depends on a material property required for the composite material 400 which is a molded product, laminated to have a plurality of orientation angles. According to this embodiment, it is assumed that three types of fabrics are laminated, including an NCF material having a fiber orientation of ±45°, a UD material having a fiber orientation of 90°, and a UD material having a fiber orientation of 0°.

The adhesive 520 is applied to the carbon fibers 510 to bond the carbon fibers 510 with each other. As a result, it is possible to stably maintain the carbon fibers 510 in a sheet-shaped shape and suppress a deviation of arrangement in the carbon fiber 510. In addition, when the laminate 510b of the carbon fiber 510 is preformed in a desired shape (refer to FIG. 3B), the adhesive 520 holds the shape.

A material of the adhesive 520 is not particularly limited, and any one known in the art may be employed. For example, thermoplastic resin such as polyolefin resin, styrene-based resin, nylon resins, or polyurethane resin, thermosetting resin such as epoxy resin, phenol resin, or unsaturated polyester resin, and the like may be employed. According to this embodiment, epoxy resin such as the resin used in the composite material 400 described below is employed because it is low-molecular-weight epoxy resin having, a high flowability due to a low melting viscosity, an excellent heat resistance, and an excellent humidity resistance.

As illustrated in FIG. 5A, the carbon fiber 510 has a first region 511 to which the adhesive 520 is applied, and a second region 512 to which the adhesive 520 is applied such that a content density of the adhesive 520 is lower than that of the first region 511. Note that, herein, a case where "the content density of the adhesive 520 is low" includes a case where no adhesive 520 is applied, that is, the content density is zero.

The preforming is carried out such that a curvature of the first region 511 is larger than that of the second region 512. In the second region 512 in which the content density of the adhesive 520 is low, a bonding force between the carbon fibers 510 is weak, compared to the first region 511. Therefore, deformation is relatively easy. Therefore, it is possible to suppress a wrinkle or twist, particularly, in a portion having a large curvature during the preforming of the preform 500.

(Composite Material)

A composite material 400 according to this embodiment is manufactured by infusing resin 600 into a preform 500 obtained by preforming the carbon fiber 510 in a predetermined shape in advance and curing the resin.

The composite material 400 has a strength and stiffness higher than those of a molded product solely formed of the resin 600 because the composite material 400 is formed by combining the carbon fiber 510 and the resin 600. In addition, if the composite material 400 is applied to a structural component such as a front side member 701 or a pillar 702, or an exterior component such as a roof 703 employed in an automobile car body 700 illustrated in FIG. 9B, it is possible to manufacture the car body 700 in a light weight, compared to the car body formed by assembling steel components.

The composite material 400 according to this embodiment is formed by infusing resin 600 into the preform 500. According to this embodiment, in order to improve stiffness, the core material 530 of FIG. 3B is inserted into the inside of the composite material 400.

Thermosetting resin such as epoxy resin or phenol resin is employed as the resin 600. According to this embodiment, epoxy resin is employed because it has an excellent mechanical property and excellent dimensional stability. Two-part epoxy resin is predominantly employed and is used by mixing a main agent and a curing agent. A bisphenol A-type epoxy resin is employed as the main agent, and an amine-based epoxy resin is employed as the curing agent. However, without limiting to such resins, the type of the resin may be appropriately selected depending on a desired material property. In addition, the resin 600 contains an internal release agent such that the composite material 400 can be easily released after the molding. Any type of the internal release agent known in the art may be employed without a particular limitation.

The core material 530 is formed inside the composite material 400 by infusing the resin 600 into the carbon fiber 510 while it is covered by the carbon fiber 510. As the material of the core material 530, a foam body (foam core) is preferably employed from the viewpoint of the light weight, but not limited thereto. For example, a foam body formed of polyurethane resin, vinyl chloride resin, polyolefin, acrylic resin, polyimide resin (for example polymethacrylimide (PMI), or polyetherimide (PEI)) is appropriately employed.

(Manufacturing Apparatus)

A manufacturing apparatus 100 for the composite material 400 will be described with reference to FIGS. 1 to 4. The manufacturing apparatus 100 for the composite material 400 according to this embodiment can be classified into a preforming apparatus 200 for preforming the preform 500 illustrated in the upper and middle parts of FIG. 1, and a molding apparatus 300 for molding the composite material 400 using the preform 500 illustrated in the lower part of FIG. 1. In addition, the manufacturing apparatus 100 of the composite material 400 has a control unit 110 for controlling operation of the entire manufacturing apparatus 100.

First, the preforming apparatus 200 for preforming the preform 500 will be described.

In general, as illustrated in the upper part of FIG. 1, the preforming apparatus 200 includes a conveying unit 210 configured to continuously conveys the carbon fiber 510, an applying unit 220 configured to apply the adhesive 520 to the carbon fiber 510, a heater 230 configured to heat the carbon fiber 510 applied with the adhesive 520, a cutting unit 240 configured to cut the carbon fiber 510, and a preform die 260 configured to preform the carbon fiber 510.

As illustrated in the upper part of FIG. 1, the conveying unit 210 continuously conveys the carbon fiber 510 supplied from a base roll 510a, around which the carbon fiber 510 is wound, to an applying unit 220, a heater 230, and a cutting unit 240 included in a downstream process. The conveying unit 210 is a belt conveyor. The applying unit 220, the heater 230, and the cutting unit 240 are placed along the conveyance path of the belt conveyor to allow a continuous work.

Figure 2A:
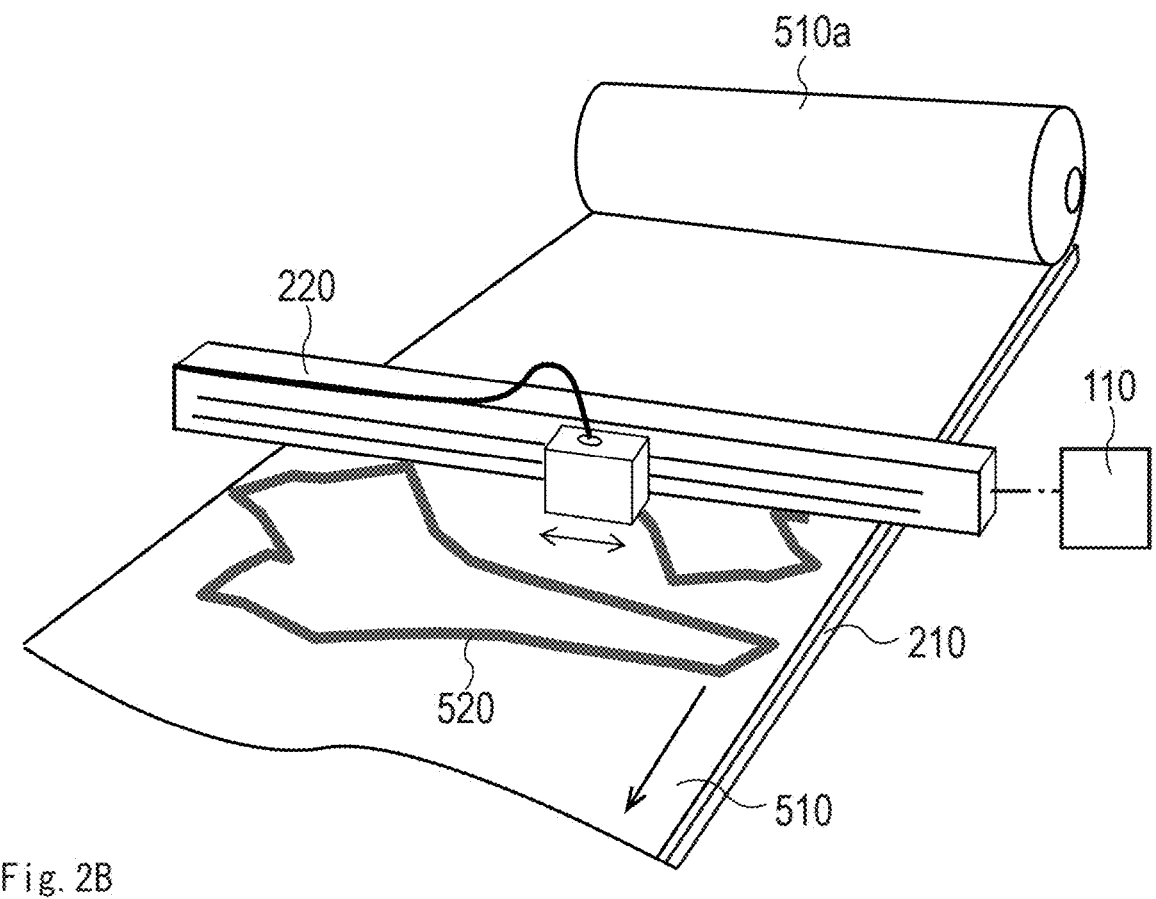
FIG. 2A is a schematic perspective view illustrating an applying unit.

As illustrated in FIG. 2A, the applying unit 220 is configured to move in a planar direction of the conveying unit 210 to apply an adhesive 520 to the carbon fiber 510 conveyed from the upstream of the conveying unit 210. The application amount of the adhesive 520 depends on a type and physical properties of the adhesive 520, and may be set to, for example, 10 to 100 g/m$^3$. The applying unit 220 may be configured, for example, on the basis of a screen printing method using a powdered (solid) adhesive 520, an inkjet method using a liquid adhesive 520, a laminating method in which the adhesive 520 processed into a nonwoven fabric, which is laminated on the carbon fiber 510, and the like. According to this embodiment, the inkjet method is employed because it provides high mass productivity and high accuracy. In the inkjet method, the adhesive 520 is made into fine droplets and is sprayed directly to the carbon fiber 510, and the application amount of the adhesive 520 can be adjusted depending on a portion to be applied.

Figure 5B:
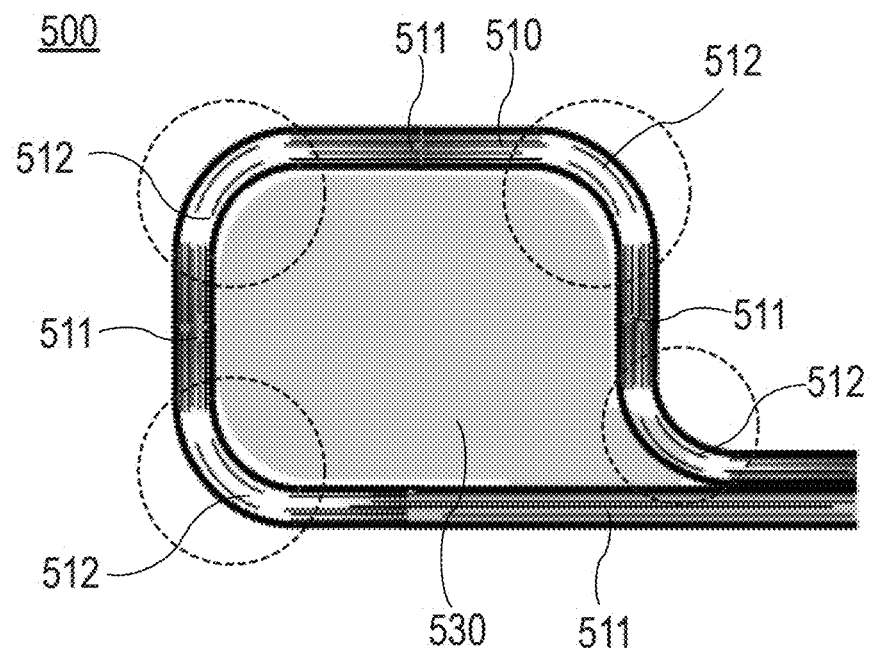
FIG. 5B is an explanatory diagram illustrating a content density distribution of the adhesive in the preformed preform.

The applying unit 220 applies the adhesive 520 on the carbon fiber 510 so as to form a first region 511 having a relatively high content density of the adhesive 520 and a second region 512 having a relatively lower content density of the adhesive 520 than that of the first region 511. According to this embodiment, as illustrated in FIG. 5A, the first region 511 has a content density distribution including a portion in which the content density of the adhesive 520 is high (a dark color portion in FIG. 5A) and a portion in which the content density of the adhesive 520 is low (a pale color portion in FIG. 5A). Similarly, the second region 512 also has a content density distribution. In this manner, if the content density distribution has three or more scales, it is desirable that a portion around the cutting line L cut by the cutting unit 240 described later is set as a portion having the highest content density of the adhesive 520. In addition, as illustrated in FIG. 5B, the adhesive 520 is applied such that a portion having a large curvature (a portion surrounded by a dashed line) in the three-dimensional shape molded by the preform die 260 becomes the second region 512 having a relatively low content density of the adhesive 520.

Figure 2B:
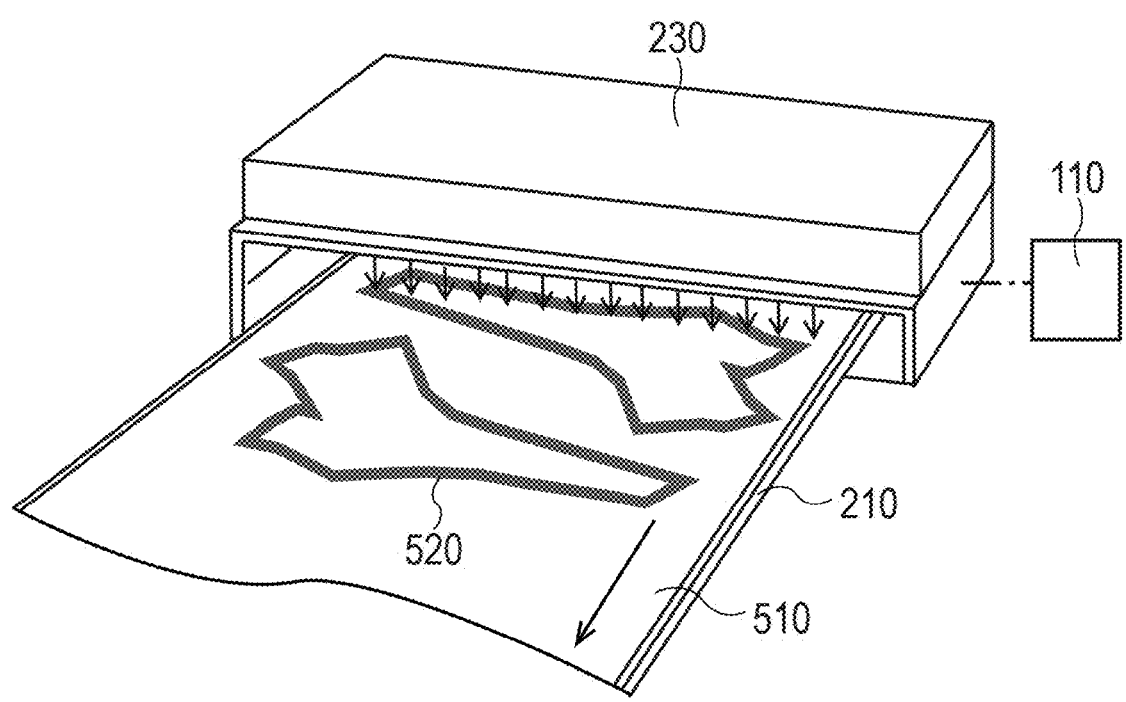
FIG. 2B is a schematic perspective view illustrating a heater.

As illustrated in FIG. 2B, the heater 230 heats the carbon fiber 510 to which the adhesive 520 is applied by the applying unit 220. A heating temperature depends on the melting temperature of the adhesive 520 to be used, for example, it may be set to 70 to 150° C. As a result, the adhesive 520 can be softened or melted and infused into the carbon fiber 510. As a result of infusion of the adhesive 520, the content of the adhesive 520 per unit area of the carbon fiber 510, that is, the content density is determined. Although not particularly limited, it is desirable that the heater 230 is configured to instantaneously and evenly heating the carbon fiber 510. For example, the heater 230 may be a continuous furnace, a high frequency coil, a far infrared heater, a hot wind blower, and the like.

As illustrated in FIG. 3A, the cutting unit 240 cuts the carbon fiber 510 infused with the adhesive 520 along a predetermined cutting line L. The cutting unit 240 may include various cutting mechanisms such as an ultrasonic cutter, a laser cutter, a circular saw cutter, a press cutter, and a scissors cutter. According to this embodiment, an ultrasonic cutter is employed because it can accurately cut the carbon fiber 510 within a relatively short time. In addition, as described above, the portion around the cutting line L is set as a portion having a relatively high content density of the adhesive 520 in the first region 511. As a result, it is possible to remarkably reduce disarray of the cut surface during the cutting or when the carbon fiber 510 is conveyed to the next process after cutting. If disarray is generated in the cut surface, it is necessary to form the preform 500 in a large size in advance in order to remove an end portion after the molding of the composite material 400. By suppressing disarray on the cut surface, a post process for removing the end portion of the composite material 400 can be reduced. Therefore, it is possible to further improve a yield of the carbon fiber 510.

The preform die 260 is used to preform the carbon fiber 510 in a predetermined three-dimensional shape. As illustrated in the middle part of FIG. 1, the preform die 260 has a lower die 261 in which the carbon fiber 510 as a target of the preform 500 is placed, and an upper die 262 that is movable to and from the lower die 261. A preforming surface matching the shape of the preform 500 of the carbon fiber 510 is formed on a surface of the upper die 262 facing the lower die 261. By applying a pressing force to the carbon fiber 510 by moving the upper die 262 toward the lower die 261 while the carbon fiber 510 is placed on the lower die 261, the carbon fiber 510 can be formed into the preform 500.

In the case of the composite material 400 in which a closed cross section is formed by inserting the core material 530 as in this embodiment, the corner portion often has a large curvature as illustrated in FIG. 5B. When this corner portion is preformed, a deformation amount is significantly different between an inner portion of the carbon fiber 510 and an outer portion of the carbon fiber 510. Therefore, although a deviation between the layers of the carbon fibers 510 of the corner portion is larger than a deviation of a planar portion having a small curvature, if the layers are bonded by the adhesive 520, the carbon fibers 510 at the corner portion are restrained by the bonding force of the adhesive 520. Therefore, deformation at the corner portion is restricted. If the preforming is carried out while deformation of the carbon fiber 510 is restricted, a wrinkle or twist is generated in a portion having a large curvature of the preform 500 after the preforming.

As described above, according to this embodiment, a portion of the preformed three-dimensional shape having a large curvature and a large deformation amount is set as the second region 512 having a relatively low content density of the adhesive 520. As a result, a bonding force caused by the adhesive 520 between the layers of the carbon fibers 510 is relatively weak. Therefore, deformation can be easily generated in the second region 512. Therefore, it is possible to suppress a wrinkle or twist of the preform 500 in a large curvature portion. As a result, it is possible to improve a degree of freedom in the shape of the preform 500 and widen a selection range of the shape of the composite material 400.

Next, a molding apparatus 300 for molding the composite material 400 using the preform 500 will be described.

Referring to FIG. 4, the molding apparatus 300 according to this embodiment generally includes an openable/closable mold 310 for forming a cavity 350 in which the preform 500 is placed, a press unit 320 that applies a clamping pressure to the mold 310, a resin injection unit 330 that injects melted resin 600 into the cavity 350, and a mold temperature adjustment unit 340 that adjusts a temperature of the mold 310.

The mold 310 has an openable/closable pair of an upper (male) die 311 and a lower (female) die 312. The upper die 311 and the lower die 312 form the cavity 350 hermetically sealed therebetween. The preform 500 is placed in the cavity 350.

The mold 310 further has an injection port 313 for injecting resin 600 into the cavity 350. The injection port 313 communicates with the cavity 350 and the resin injection unit 330. The resin 600 is infused from the surface to the inside of the preform 500. Note that a suction hole for suctioning the air by vacuum evacuation inside the cavity 350 may be provided in the lower die 312. In addition, in order to hermetically seal the cavity 350, a seal member or the like may be provided on mating faces between the upper and lower dies 311 and 312.

The press unit 320 may be a press machine that has a cylinder 321 actuated by a fluid pressure such as a hydraulic pressure to adjust the clamping pressure by controlling the hydraulic pressure.

The resin injection unit 330 may be provided with a known circulation type pump mechanism capable of supplying, to the mold 310, a main agent supplied from a main agent tank 331 and a curing agent supplied from a curing agent tank 332 while circulating them. The resin injection unit 330 communicates with the injection port 313 to inject the resin 600 into the cavity 350.

The mold temperature adjustment unit 340 heats the mold 310 to the curing temperature of the resin 600 to cure the resin 600 injected into the cavity 350. The mold temperature adjustment unit 340 is a heating apparatus and may include, for example, an electric heater for directly heating the mold 310, a temperature adjustment mechanism for adjusting the temperature by circulating a heating medium such as oil.

The control unit 110 controls the operation of the entire manufacturing apparatus 100. Specifically, referring to FIG. 4, the control unit 110 includes a memory unit 111, a computation unit 112, and an input/output unit 113 that transmits and receives various data or control commands. The input/output unit 113 is electrically connected to the applying unit 220, the heater 230, the cutting unit 240, the preform die 260, the press unit 320, the resin injection unit 330, and the mold temperature adjustment unit 340.

The memory unit 111 includes a ROM or RAM to store data such as an application amount of the adhesive 520 and an applied shape. The computation unit 112 has a central processing unit (CPU) as a main component and receives data such as a conveyance speed of the carbon fiber 510 in the conveying unit 210 via an input/output unit 113. The computation unit 112 computes an application timing or amount of the adhesive 520, a heating temperature of the mold 310 in the mold temperature adjustment unit 340, and the like on the basis of the data read from the memory unit 111 and the data received from the input/output unit 113. The control signal based on the computed data is transmitted to the applying unit 220, the heater 230, the cutting unit 240, the preform die 260, the press unit 320, the resin injection unit 330, and the mold temperature adjustment unit 340 via the input/output unit 113. In this manner, the control unit 110 controls the application amount and location of the adhesive 520, operation of the preform die 260, the clamping pressure of the mold 310, the injection amount of the resin 600, the temperature of the mold 310, and the like.

(Manufacturing Method)

A manufacturing method for the composite material 400 according to an embodiment will be described.

The manufacturing method for the composite material 400 generally includes two processes, that is, a process of molding the preform 500 of FIG. 7 and a process of molding the composite material 400 using the preform 500 of FIG. 8.

First, the process of forming the preform 500 will be described.

As illustrated in FIG. 7, the process of forming the preform 500 includes a supplying process for supplying a material of the carbon fiber 510 (step S11), an applying process for applying the adhesive 520 to the sheet-shaped carbon fiber 510 having the first and second regions 501 and 502 such that a content density of the adhesive 520 in the second region 502 is lower than that of the first region 501 (step S12), a heating process for heating the carbon fiber 510 (step S13), a cutting process for cutting the carbon fiber 510 (step S14), a laminating process for forming the laminate 510*b* (step S15), a conveying process for conveying the laminate 510*b* (step S16), a preforming process for forming the preform 500 by preforming the carbon fiber 510 (step S17), and a process of releasing the formed preform 500 from the preform die 260 (step S18).

Each process will be described.

First, in step S11, as illustrated in the upper part of FIG. 1, the carbon fiber 510 is extracted from the base roll 510*a* around which the carbon fiber 510 is wound, and is continuously supplied to the conveying unit 210.

Then, in step S12, as illustrated in FIG. 2A, the applying unit 220 applies the adhesive 520 to the carbon fiber 510 continuously delivered from the conveying unit 210. In this case, the application amount is adjusted depending on a predetermined content density distribution. That is, as illustrated in FIG. 5A, the adhesive 520 is applied so as to form the first region 511 having a relatively high content density of the adhesive 520 and a second region 512 having a content density of the adhesive 520 lower than that of the first region 511.

Specifically, as illustrated in FIG. 5A, the first region 511 is set as a portion around the cutting line L cut in the cutting process and a portion having a relatively small deformation amount in the preforming of the performing process. In particularly, the adhesive 520 is applied to the portion around the cutting line L such that the content density of the adhesive 520 becomes relatively high in the first region 511. As illustrated in FIG. 6, the adhesive 520 is applied to the portion around the cutting line L in a band shape by providing a predetermined application width W for the cutting line L. The application width W of the adhesive 520 depends on a predetermined tolerance of the cutting line L, and may be set to, for example, 1 to 20 mm. As a result, it is possible to remarkably reduce disarray on the cut surface caused by the cutting. It is possible to prevent disarray even when the cut portion is deviated from the cutting line L because the content density of the adhesive 520 is high. In addition, the second region 512 is set as a portion in which deformation during the preforming in the performing process is relatively large, and the curvature after the preforming is large.

Then, in step S13, as illustrated in FIG. 2B, the applied adhesive 520 is softened or melted by heating the carbon fiber 510 using the heater 230, and the adhesive 520 is infused between layers of the carbon fiber 510.

Then, in step S14, as illustrated in FIG. 3A, the carbon fiber 510 is cut along the cutting line L while the adhesive 520 is melted. An exploded shape of the composite material 400 as a molded product is set in advance, and the cutting line L is determined depending on the exploded shape.

Then, in step S15, as illustrated in the laminating process of the middle part of FIG. 1, a predetermined number of sheets of the cut carbon fibers 510 are laminated using a carriage robot 250. According to this embodiment, the carbon fibers 510 are laminated in different lamination orientations in a predetermined lamination structure. Specifically, three types of materials are employed, including an NCF material having a fiber orientation of ±45°, a UD material having a fiber orientation of 90°, and a UD material having a fiber orientation of 0°. For this reason, the supplying process, the applying process, the heating process, and the cutting process are carried out in lanes of production lines different from each other, so that the carbon fibers 510 cut at respective orientation angles are laminated in a predetermined alignment to form the laminate 510*b*.

Then, in step S16, as illustrated in FIG. 3B, the laminate 510*b* is conveyed to and placed on the lower die 261 of the preform die 260. In this case, since the layers of the carbon fibers 510 are bonded using the adhesive 520, it is possible to suppress a deviation of the carbon fiber 510 during the conveyance. A temperature during the conveyance is preferably managed such that the temperature of the carbon fiber 510 decreases to, for example, 50 to 70° C. If the temperature is managed in this manner, the adhesive 520 can have a half-curing state or a curing state when the carbon fiber 510 is conveyed to the preform die 260. As a result, the adhesive 520 can be cured within a short time during the preforming. Therefore, it is possible to shorten the time for the preforming.

Then, in step S17, as indicated by the arrow of FIG. 3B, the laminate 510*b* of the carbon fiber 510 placed in the lower die 261 of the preform die 260 is preformed to preform the preform 500. In this case, a core material 530 is disposed such that it is covered by the carbon fiber 510. The upper die 262 may have a plurality of divided dies as illustrated in the preforming process in the middle part of FIG. 1, or may have a single die. The preform die 260 is preferably cooled, for example, to a temperature of 20 to 40° C. As a result, cooling of the adhesive 520 starts as soon as the mold is closed, so that the adhesive 520 is hardened, and the preforming is completed.

Then, in step S18, the preform die 260 is opened, and the preform 500 is released, so that the preforming of the preform 500 is completed. As illustrated in FIG. 5B, a planar portion having a small curvature in the shape of the molded preform 500 is the first region 511 having a relatively high content density of the adhesive 520. A portion having a large curvature (a portion surrounded by a dashed line) is the second region 512 having a relatively low content density of the adhesive 520.

Next, a process of molding the composite material 400 using the preform 500 will be described.

As illustrated in FIG. 8, the process of molding the composite material 400 includes a process of placing the preform 500 in the cavity 350 of the mold 310 (step S21), a process of injecting the resin 600 into the cavity 350 (step S22), a process of curing the resin 600 (step S23), and a process of releasing the molded composite material 400 from the mold 310 (step S24).

Each process will be described.

First, in step S21, the preform 500 is placed in the cavity 350 of the mold 310 (refer to FIG. 4).

Then, in step S22, the resin 600 is injected into the cavity 350. The mold 310 is heated in advance to a curing temperature of the resin 600 (for example, epoxy resin) or higher (for example, 100 to 160° C.).

Then, in step S23, the resin 600 infused into the carbon fiber 510 is cured.

Then, in step S24, after the resin 600 is cured, the mold 310 is opened, and the composite material 400 obtained by integrating the carbon fiber 510, the resin 600, and the core material 530 is released, so that the molding is completed.

As described above, in the manufacturing method for the composite material 400 and the manufacturing apparatus 100 according to this embodiment, the adhesive 520 is applied such that the content density of the adhesive 520 in the second region 512 is lower than that of the first region 511 of the carbon fiber 510, and the carbon fiber 510 is preformed in a three-dimensional shape having a curvature of the second region 512 larger than that of the first region 511.

In the manufacturing method for the composite material 400 and the manufacturing apparatus 100 configured as described above, the large curvature portion is set to the second region 512 having a relatively low content density of the adhesive 520. Therefore, a bonding force of the adhesive 520 between the layers of the carbon fibers 510 is relatively weak. For this reason, the carbon fiber 510 is easily deformed in the second region 512. In the large curvature portion, a wrinkle or twist of the preform 500 can be suppressed. Therefore, it is possible to improve a degree of freedom in the preform 500. As a result, it is possible to widen a selection range of the shape of the composite material 400 while suppressing a deviation of the arrangement of the reinforced fiber using the adhesive 520.

The carbon fiber 510 applied with the adhesive 520 is heated before the preforming. As a result, it is possible to infuse the adhesive 520 into the carbon fiber 510.

The carbon fiber 510 applied with the adhesive 520 is cut along the cutting line L. In addition, the first region 511 includes this cutting line L. As a result, the infusion density of the adhesive 520 is relatively high in the cut portion. Therefore, it is possible to suppress disarray of the carbon fiber 510 during the cutting.

A laminating process of forming a laminate 510b by laminating the carbon fibers 510 applied with the adhesive 520 is further provided between the applying process and the preforming process. As a result, it is possible to convey carbon fibers 510 to the preforming process while they are bonded with the adhesive 520. Therefore, it is possible to suppress a deviation of the arrangement of the carbon fiber 510.

The adhesive 520 is formed of a material softened by heat. As a result, it is possible to easily infuse the adhesive 520 into the carbon fiber 510 by applying heat.

In the preform 500 according to this embodiment, the carbon fiber 510 has a first region 511 and a second region 512 having a content density of the adhesive 520 lower than that of the first region 511, and the first region 511 has a curvature larger than that of the second region 512. As a result, it is possible to suppress a wrinkle or twist of the preform 500 in the large curvature portion. Therefore, it is possible to improve a degree of freedom in the shape of the preform 500.

In the composite material 400 according to this embodiment, the carbon fiber 510 has the first region 511 and the second region 512 having a content density of the adhesive 520 lower than that of the first region 511, and the curvature of the first region 511 is larger than that of the second region 512. As a result, a wrinkle or twist of the preform 500 can be suppressed in the large curvature portion. Therefore, it is possible to improve a degree of freedom in the shape of the preform 500. For this reason, it is possible to widen a selection range of the shape of the composite material 400.

While the manufacturing method for the composite material, the manufacturing apparatus, and the composite material have been described throughout the embodiments hereinbefore, the invention is not limited to the configurations described in the embodiments, and may be suitably changed on the basis of the claims.

For example, although the heating process is carried out before the cutting process, it may be carried out after the cutting process or the lamination process as well.

Although the laminate is formed by laminating a plurality of layers of the reinforcements, the composite material may be formed from a single reinforcement.

REFERENCE SIGNS LIST

100 Manufacturing apparatus
110 Control unit
200 Preforming apparatus
220 Applying unit
230 Heater
240 Cutting unit
260 Preform die
300 Molding apparatus
310 Mold
400 Composite material
500 Preform
510 Carbon fiber (reinforcement)
510b Laminate
511 First region
512 Second region
520 Adhesive
530 Core material
600 Resin
L Cutting line

The invention claimed is:

1. A manufacturing method for a composite material comprising a reinforcement, an adhesive applied to the reinforcement, a resin infused into a preform, and a core material covered by the reinforcement, comprising:
applying the adhesive to sheet-shaped reinforcement having first and second regions such that a content density of the adhesive of the second region is lower than that of the first region, the content density of the adhesive of the second region being non-zero;
heating the reinforcement applied with the adhesive before forming the preform to infuse the adhesive into the reinforcement;
forming the preform comprising the core material by preforming the reinforcement in a three-dimensional shape such that the core material is covered by the reinforcement infused with the adhesive, and in the preforming, the second region is placed at a portion of the core material having a curvature larger than that of a portion where the first region of the reinforcement is placed; and
producing the composite material by infusing the resin into the preform and curing the resin.

2. The manufacturing method for the composite material according to claim 1, wherein the reinforcement is cut along a cutting line after the adhesive is applied, and the first region includes the cutting line.

3. The manufacturing method for the composite material according to claim 1, wherein, after the adhesive is applied, a laminate is formed by laminating the reinforcement applied with the adhesive before the reinforcement is preformed.

4. The manufacturing method for the composite material according to claim 1, wherein the adhesive is formed of a material softened by heat.

\* \* \* \* \*